(12) United States Patent
Krebs et al.

(10) Patent No.: US 10,044,126 B2
(45) Date of Patent: Aug. 7, 2018

(54) PLUG CONNECTOR TO CONNECT TWO ELECTRICAL ASSEMBLIES

(71) Applicant: Lisa Draexlmaier GmbH, Vilsbiburg (DE)

(72) Inventors: Annika Krebs, Ergolding (DE); Robert Saller, Egglkofen (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 0 days.

(21) Appl. No.: 15/698,976

(22) Filed: Sep. 8, 2017

(65) Prior Publication Data

US 2018/0069336 A1 Mar. 8, 2018

(30) Foreign Application Priority Data

Sep. 8, 2016 (DE) .................... 10 2016 116 842

(51) Int. Cl.
*H01R 13/62* (2006.01)
*H01R 13/187* (2006.01)

(52) U.S. Cl.
CPC ................. *H01R 13/187* (2013.01)

(58) Field of Classification Search
CPC .. H01R 13/187; H01R 13/625; H01R 13/623; H01R 13/627; H01R 24/40; H01R 2103/00
USPC ........................................ 439/319
See application file for complete search history.

(56) References Cited

U.S. PATENT DOCUMENTS

| | | | | |
|---|---|---|---|---|
| 1,420,437 A | * | 6/1922 | Mayer .................... | A63G 1/34 472/37 |
| 1,651,753 A | * | 12/1927 | Dayes ................. | H01M 2/1077 429/156 |
| 1,808,368 A | * | 6/1931 | Montambault ...... | H01R 11/282 439/759 |
| 3,056,850 A | * | 10/1962 | Rauske ............... | H01M 2/0202 429/157 |
| 3,147,151 A | * | 9/1964 | Toce ................... | H01M 2/0245 429/120 |
| 3,463,672 A | * | 8/1969 | Schmidt .................. | H01M 2/10 220/23.4 |

(Continued)

FOREIGN PATENT DOCUMENTS

WO 2002007264 1/2002

*Primary Examiner* — Abdullah Riyami
*Assistant Examiner* — Vladimir Imas
(74) *Attorney, Agent, or Firm* — Burris Law, PLLC

(57) ABSTRACT

A plug connector to connect two electrical assemblies is provided that establishes a releasable connection between the assemblies, such as cells of a battery. The plug connector includes two contact pins, each connected to an electrical assembly, and a parallel plug connector with a busbar that is firmly connected to two contact housings. The length and shape of the parallel plug connector are adapted to the spacing of the contact pins of adjacent electrical assemblies when in the installed position. In this installed position, the parallel plug can connect the electrical assemblies together. In this form, tolerances in the position of the electrical assemblies are compensated in the insertion direction. The contact housings have common insertion directions and the parallel plug is movable from the insertion direction onto the two contact pins simultaneously. In this form, the parallel plug can be inserted after installation of the electrical assemblies.

11 Claims, 5 Drawing Sheets

(56) References Cited

U.S. PATENT DOCUMENTS

| | | | | |
|---|---|---|---|---|
| 3,650,841 | A * | 3/1972 | Brindley | H01M 2/105 429/159 |
| 3,977,907 | A * | 8/1976 | Roth | H01M 2/105 429/121 |
| 4,018,497 | A * | 4/1977 | Bulanchuk | H02G 5/04 174/94 S |
| 4,106,833 | A * | 8/1978 | Wilson | H01M 2/202 324/426 |
| 4,117,203 | A * | 9/1978 | Sjogren | H01M 2/105 429/121 |
| 4,347,294 | A * | 8/1982 | Mejia | H01M 2/0245 429/151 |
| 4,407,911 | A * | 10/1983 | Hooke | H01M 2/105 429/159 |
| 4,522,900 | A * | 6/1985 | Mejia | H01M 2/0245 429/181 |
| 5,533,915 | A * | 7/1996 | Deans | H01R 13/17 439/678 |
| 6,001,504 | A * | 12/1999 | Batson | H01M 2/0232 429/163 |
| 6,391,489 | B1 * | 5/2002 | Winch | H01R 11/288 429/1 |
| 6,939,167 | B2 * | 9/2005 | Kosuge | H01R 11/281 439/522 |
| 7,229,327 | B2 * | 6/2007 | Zhao | H01M 2/206 439/627 |
| 7,374,460 | B1 * | 5/2008 | Hariharesan | H01R 13/187 439/679 |
| 7,507,124 | B2 * | 3/2009 | Kim | H01R 11/288 439/510 |
| 7,531,270 | B2 * | 5/2009 | Buck | H01M 2/1077 429/100 |
| 7,614,906 | B2 * | 11/2009 | Kim | H01R 11/288 439/500 |
| 7,635,537 | B2 * | 12/2009 | Vutetakis | H01M 2/266 429/149 |
| 7,867,038 | B2 * | 1/2011 | Hariharesan | H01R 13/187 439/679 |
| 8,303,317 | B1 * | 11/2012 | Gao | H01R 12/714 439/660 |
| 8,628,335 | B1 * | 1/2014 | Zhao | H01M 2/206 439/33 |
| 8,632,369 | B2 * | 1/2014 | Lee | H01G 9/26 439/766 |
| 8,647,766 | B2 * | 2/2014 | Maguire | H01M 2/1077 429/160 |
| 8,808,031 | B2 * | 8/2014 | Zhao | H01M 2/206 439/620.27 |
| 8,846,240 | B2 * | 9/2014 | Merriman | H01M 2/206 429/155 |
| 8,950,537 | B2 * | 2/2015 | Yokoyama | B60R 16/0239 180/68.5 |
| 8,992,268 | B2 * | 3/2015 | Casses | H01M 2/206 439/627 |
| 9,005,794 | B2 * | 4/2015 | Zhao | H01M 2/26 429/121 |
| 9,136,644 | B2 * | 9/2015 | Yu | H01R 13/64 |
| 9,142,917 | B2 * | 9/2015 | Yu | H01R 13/631 |
| 9,147,916 | B2 * | 9/2015 | Bronczyk | H01M 2/1077 |
| 9,196,991 | B2 * | 11/2015 | Liu | H01R 13/112 |
| 9,231,326 | B2 * | 1/2016 | Goesmann | H01R 13/187 |
| 9,269,944 | B2 * | 2/2016 | Min | H01M 2/206 |
| 9,306,348 | B2 * | 4/2016 | Feng | H01R 24/78 |
| 9,437,859 | B2 * | 9/2016 | Merriman | H01M 10/4207 |
| 9,478,779 | B2 * | 10/2016 | Burkman | H01M 2/1077 |
| 9,620,761 | B2 * | 4/2017 | Smith | H01M 2/202 |
| 9,799,862 | B2 * | 10/2017 | Kwag | H01M 2/1077 |
| 9,812,693 | B2 * | 11/2017 | DeKeuster | H01M 2/305 |
| 2005/0250386 | A1 * | 11/2005 | Kim | H01R 11/288 439/627 |
| 2011/0076886 | A1 | 3/2011 | Hariharesan et al. | |
| 2015/0079856 | A1 | 3/2015 | Zhao et al. | |
| 2015/0221921 | A1 * | 8/2015 | Choi | H01R 9/2458 429/158 |
| 2018/0090920 | A1 * | 3/2018 | Shoji | H01M 2/206 |

\* cited by examiner

PLUG CONNECTOR TO CONNECT TWO ELECTRICAL ASSEMBLIES

CROSS-REFERENCE TO RELATED APPLICATIONS

This application claims priority to and the benefit of German Patent Application No. DE 10 2016 116 842.4 filed on Sep. 8, 2016. The disclosure of the above application is incorporated herein by reference.

FIELD

The present disclosure relates to a plug connector to connect two electrical assemblies, which establishes a detachable connection between the assemblies, such as cells of a battery.

BACKGROUND

The statements in this section merely provide background information related to the present disclosure and may not constitute prior art.

Electrical systems rely heavily on connections of electrical assemblies to one another. This need is generally met with permanent, especially non-detachable mechanical and/or electrical connections such as those produced by soldering or welding, or with complex detachable connections. These connections, which can only be disconnected with difficulty, include screwed joints or plugs that typically contain a safeguard against unintentional opening.

The solution shown for an electricity meter in WO 2002/007264 A1 does permit the transfer of large currents and reduces the material required for conductors. However, this configuration can only be detached with great effort.

It has also been common practice up to now to connect two units or cells in batteries by screwing them together. However, this connection is expensive and complicated to produce.

Now, if in the operation of the electrical system it becomes necessary for the electrical connection between the assemblies (e.g., between the cells of a battery) to open quickly and autonomously, as is the case in a motor vehicle collision, for example, then the difficult-to-release connections become an obstacle.

SUMMARY

The present disclosure provides an easily releasable connection between two electrical assemblies. In one form, the present disclosure includes the plug connection with the features of claim 1. Advantageous forms of the present disclosure are found in the other claims, the description and the drawings.

To this end, the plug connector of the present disclosure includes two contact pins, each connected to an electrical assembly, and a parallel plug connector with a busbar that is firmly connected to two contact housings. The length and shape of the parallel plug connector are adapted to the spacing of the contact pins of adjacent electrical assemblies (to be connected together) when in the installed position. In this installed position, the parallel plug connector can correctly connect the two electrical assemblies together. In this way tolerances in the position of the electrical assemblies are also automatically compensated in the direction of insertion.

In addition, the contact housings have one common direction of insertion and the parallel plug connector is movable from the direction of insertion onto the two contact pins together. In this way the parallel plug connector can be inserted after installation of the electrical assemblies.

The present disclosure is less expensive by almost half and lighter than the previously used screwed connection. It is plugged in once during assembly, rather than being screwed together and checked four times.

The releasability of the connection also stems from the circumstance that the plug connection opens not only when the distance between the electrical assemblies and thus between the contact pins increases, but also when it decreases. This type of change in position occurs, for example, in an accident involving the vehicle in which the assemblies are installed.

According to an advantageous further development of the present disclosure, the contact pins have a contact area that is oriented in the direction of insertion and an attachment area that is connected to the contact area through a bend. The orientation of the contact area enables the separation in the event of a change of position in the direction of insertion. The bending of the attachment area that creates the connection between contact pin and the electrical assembly makes it possible to keep the length of the parallel plug connector down with regard to the contact area, while simultaneously providing a secure attachment between the contact pin and the electrical assembly.

It is also advantageous if the contact pins have a contact area that comes into contact with the parallel plug connector, and the contact area is tapered, i.e. wall thicknesses of the width and thickness of the contact pins are reduced by slanting. This results in an insertion aid that accelerates and simplifies the insertion of the parallel plug connector onto the contact pins.

An additional advantageous form of the plug connector provides that the contact housings have the following structure:

a sleeve that forms a receiving space on its inside for the contact pin to be inserted in an insertion direction is supplemented by a contact spring attached to the inside of the sleeve and by a plate-like contact tab attached to the sleeve, thereby forming the receiving space for the contact spring between the contact tab and the contact spring. According to another form of this variant, the contact spring has one or two bulges, both of which are oriented toward the contact tab. In this way, the contact housing generates a contact pressure on an inserted contact pin over a certain length, and at the same time, the connection remains releasable. The contact spring may be designed to fan out into several individual laminas between its two ends, with the result that a plurality of single contact points is created between the contact pin and contact spring.

The sleeve is open at least at the front side to permit the plug-in contact to be inserted from the front. It may also be open on two sides (i.e. at the front and the back). The sleeve is laterally closed peripherally. It may also be referred to as a sleeve-shaped basic part, basic body, housing or cage. It may have a rectangular basic shape with rounded corners when viewed from the front (in the insertion direction).

To obtain a contact pressure that is uniform across the area of the plug-in contact, it is advantageous for the two bulges in the contact spring to be symmetrical to an imaginary axis perpendicular to the insertion direction. Thus, the two bulges hold the plug-in contact with uniform firmness.

The contact pressure is especially high when the bulges are very pronounced, with a height of a multiple of the thickness of the contact spring, specifically by a factor of 3 to 10. At the same time a reduced distance is defined between the plug-in contact and the side of the sleeve to which the contact spring is attached. It is advantageous for the bulges to have the approximate shape of a sine half-wave, meaning that the forces do not grow steadily when the contact pin is inserted, but rather they are initially high and then increase only slightly. The sine wave can also be stepped.

The contact spring is easily mounted in the sleeve by being suspended from tabs on both sides. To this end, a centric recess may be provided for each of the two ends of the contact spring and two support areas each may be provided at the edges.

In one form, the sleeve is a formed metallic sheet metal part, in particular a stamped and bent part. This keeps the manufacturing costs particularly low and allows high mechanical strength.

In another form, the one or more contact springs are made of steel such as stainless steel. In this way, an especially large contact force may be exerted on the plug-in contact, because steel has considerably higher yield strength than precious metals such as copper. As a result of the especially large contact force, it is also possible to considerably lower an electrical transition resistance between the plug-in contact and the contact part, namely even down to a value that is virtually no longer significant.

A further advantageous form of the present disclosure includes the fact that the contact tab has a profile facing the receiving space. This defines the distance of the plug-in contact from the side of the sleeve to which the contact tab is attached. In this way, a centric arrangement of the plug-in contact becomes easier and the center of gravity of the sleeve is shifted to the middle.

For improved interaction of the profile of the contact tab with the bulges of the contact spring, the profile may be formed symmetrically to an imaginary axis perpendicular to an insertion direction of the plug-in contact. Unlike the shape of the bulge, it is rather advantageous for the profile to have a flat plateau and to cover at least one intermediate section between the two bulges.

To center the plug-in contact it is advantageous for the profile to have a height amounting to a multiple of the thickness of the contact tab, particularly by a factor of 2 to 4.

If copper such as electrolytic copper or a copper alloy is selected for the contact tab and a contact surface of the contact tab at the profile is silver-plated or as an alternative coated with gold, tin or zinc, then this side of the contact is improved for a low electrical transition resistance, whereas the contact spring, for instance one of stainless steel, is improved for durable contact pressure.

With the above-mentioned constructive variants, a receiving area can be formed along a plane stretching through the middle of the sleeve, parallel to an insertion direction of the plug-in contact regardless of which side faces upwards and whether it is somewhat offset from the middle when it is inserted.

In another especially mechanically rugged form, the sleeve may also be made of steel, particularly stainless steel. This has the added advantage that chemical reactions between the contact spring and the sleeve can be avoided in this way. Steel is also less expensive than copper.

The contact housings are advantageously identical in design and parallel, and they are positioned in unidirectional orientation on the busbars. This results in simplified manufacturing of the parallel plug connector.

It has proven to be advantageous for the connection between the busbar and the contact housings to be established in each case via a clinch (TOX®) connection, particularly between the busbar and the contact tab. The connecting points of the TOX® connection are placed so as not to impede the contacting. A welded or clamped connection between the busbar and the contact housing may also be made as an alternative to the TOX® connection.

To be able to connect electrical assemblies together that are not flush with one another, it is advantageous if the busbar has a second bend that contains a flexural component perpendicular to the direction of insertion. That means that the second bend is a bend in the busbar which is therefore capable of also interconnecting those electrical components that are not in flush arrangement (including superimposed or diagonally arranged assemblies or contact pins).

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
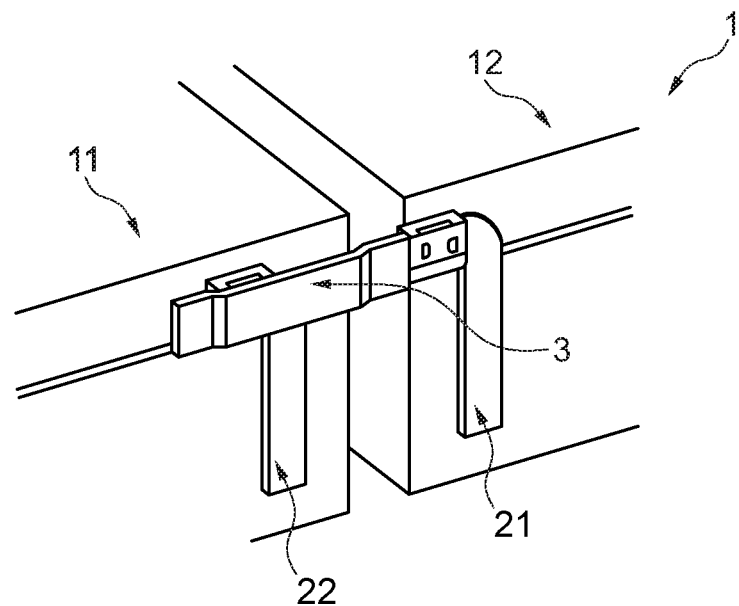
FIG. 1 shows a first plug connector according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The electrical connections referred to below are made between cells of a battery. However, according to the present disclosure, other electrical assemblies 1 may also be connected together while remaining within the scope of the present disclosure.

FIG. 1 shows two battery cells 11, 12 as electrical assemblies arranged adjacent to and flush with one another. One contact pin each 21, 22 is attached to each of the battery cells 11, 12. This results in an electrical connection between the two contact pins 21, 22 and thus between the electrical assemblies, that is suitable for transferring high currents. This is done by simultaneously plugging a parallel plug connector 3 onto the two contact pins 21, 22. The plug connection here is releasable. The length of the parallel plug connector 3 is adapted to the spacing of the two contact pins 21, 22 on the battery cells 11, 12.

Figure 2:
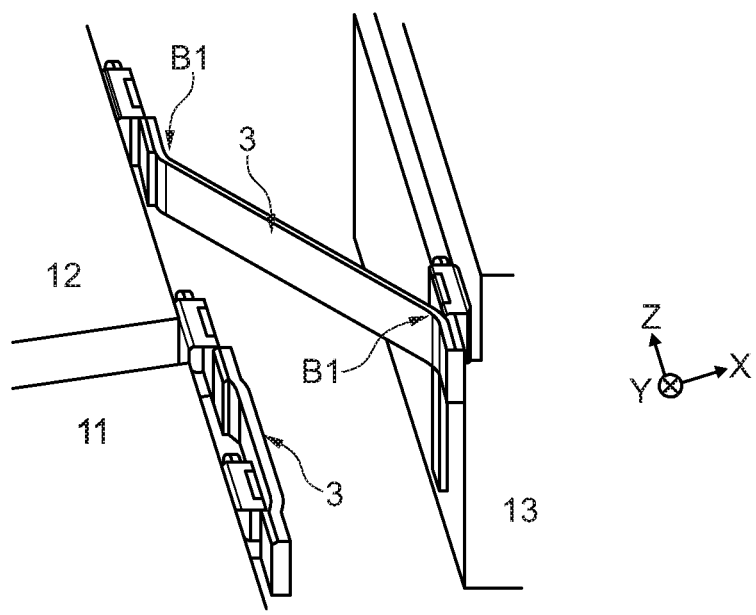
FIG. 2 shows a second plug connector according to the present disclosure.

These two battery cells 11, 12 may be part of a battery with a larger number of battery cells 11, 12, 13 as shown in FIG. 2. Thus, the battery cells 11, 12, 13 do not have to be arranged adjacent to and flush with one another in order to be connected together in accordance with the present disclosure.

In addition, FIG. 2 shows a plug connector between two electrical assemblies 12, 13 that may be arranged opposite one another and may also be connected with a parallel plug connector 3. This parallel plug connector 3 has a second bend B1 with a flexural component in the x direction shortly before each of the two ends, when otherwise the parallel plug connector 3 is essentially oriented in the z direction.

Figure 3:
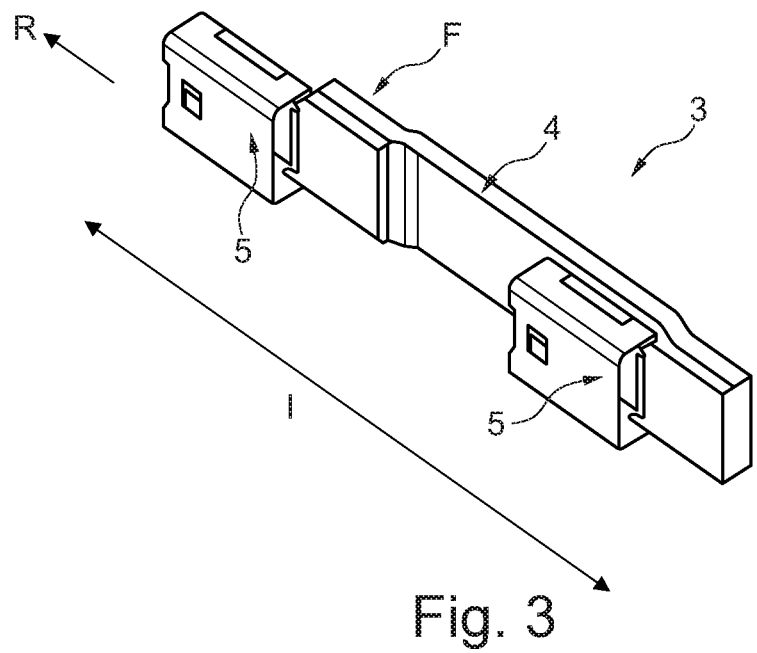
FIG. 3 shows a parallel plug connector according to the present disclosure.

The parallel plug connector 3 according to FIG. 1 is shown in greater detail in FIG. 3. The parallel plug connector 3 has a length l and includes two contact housings 5 connected together via a busbar 4. The contact housings 5 are arranged parallel to one another and have a common insertion direction R. This allows the parallel plug connector 3 to be plugged onto the contact pins 21, 22 of the two battery cells 11, 12 after they have been mounted.

Figure 4:
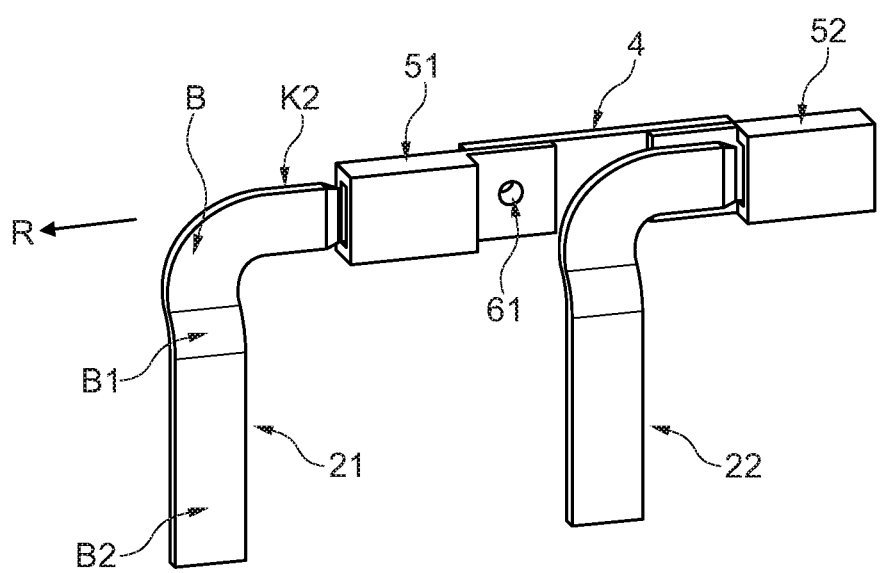
FIG. 4 shows the insertion of the parallel plug connector according to the present disclosure.

This can be seen more clearly in FIG. 4. The contact pins 21, 22 (shown here without the electrical assemblies) have an attachment area B2 that creates the electrical contact with the battery cell 11 and/or 12. The attachment area B2 is connected to a contact area K2 through a bend B. In the present case, the bend is a 90° bend. A second bend B1 is also provided on this parallel plug connector 3, which includes a flexural component in the x direction, in order to space the parallel plug connector 3 slightly apart from the electrical assemblies 11, 12. The contact area K2 is tapered as shown, to facilitate insertion of the parallel plug connector 3 at both ends—it is pushed on in the direction of insertion R.

It can be seen in the parallel plug connector 3 from FIG. 4 that the contact housings 51, 52 are each connected to the busbar 4 through a clinching or TOX® connection 61 (one of the TOX® connections is hidden by the contact pin 22). The TOX® connection 61 is made on the side of the contact housing 51, 52 that faces away from the contact pin 21, 22 in the installed state.

Figure 5:
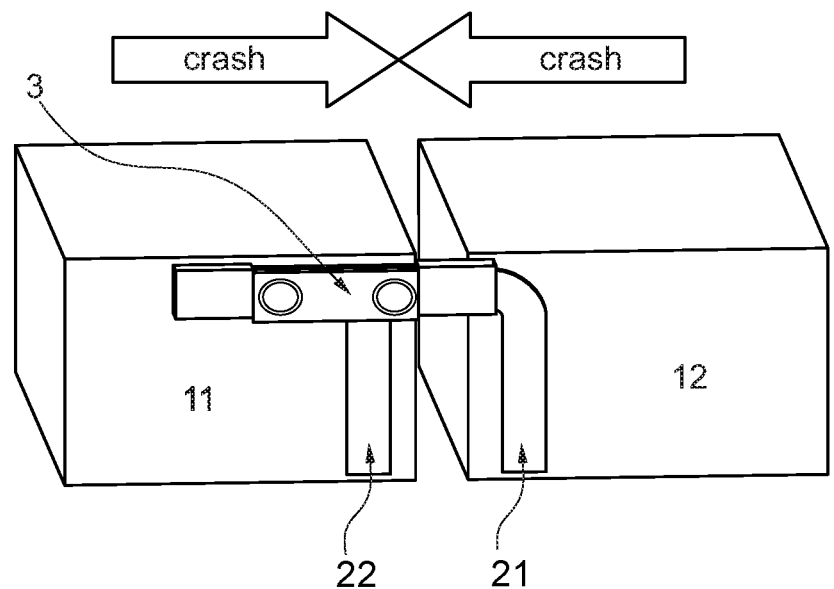
FIGS. 5 and 6 show the release of the plug connector in a crash according to the present disclosure.
Figure 6:
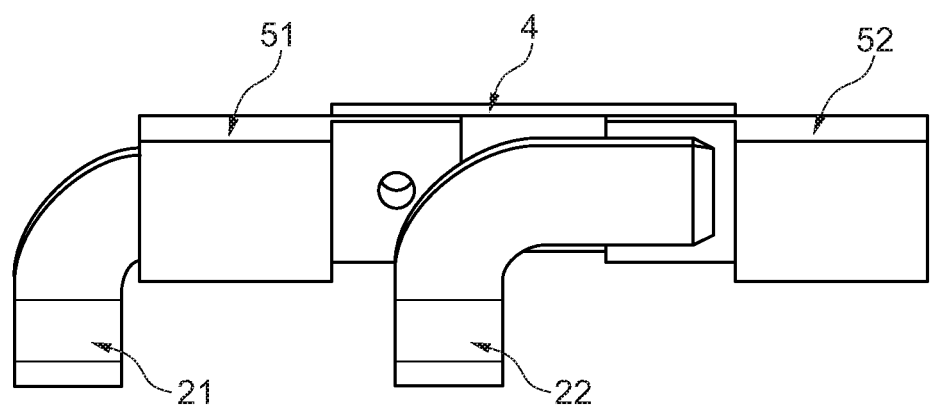

The plug connector reveals its merits not only during assembly, which can be done with no additional intermediate parts, but also in the case of a crash, shown in FIGS. 5 and 6.

If the distance between the electrical assemblies 11, 12 increases, it follows that a contact pin 21, 22 will be pulled out of the parallel plug connector 3 at least on one side—this case is not depicted. But even if the electrical assemblies 11, 12 are shoved against one another in an accident, thereby reducing the distance—see FIG. 5—there will be a separation of at least one contact pin 21/22 from the parallel plug connector 3.

In this case, the contact pin 22 on one side of the parallel plug connector 3 is pushed out of the associated contact housing 52, since the distance between the contact pins 21, 22 relative to the length l of the parallel plug connector is now too short—FIG. 6.

Figure 7:
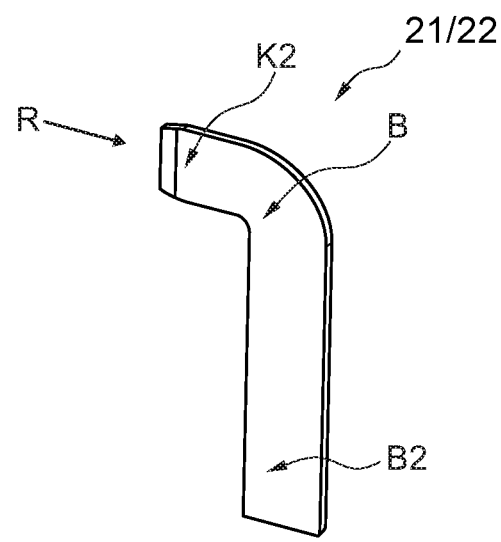
FIG. 7 shows a contact pin according to the present disclosure.

The contact pin 21/22 is shown uninstalled in FIG. 7. The contact area K2 of the contact pin 21/22 is oriented to correspond to the direction of insertion R and parallel to a side wall (not shown) of the electrical assembly. Its width and thickness are adjusted depending on the desired current carrying capacity. In addition, the end of the contact area K2 is tapered as shown. The attachment area B2 of the contact pin 21/22 in turn is oriented parallel to the side wall (not shown) of the electrical assembly but at an angle of 90° to the contact area K2. In this way, the contact pin 21/22 can be connected at any point to the electrical assembly without the parallel plug connector 3 having to be very long. The two areas K2, B2 are connected together by a bend B, and the width and thickness of the contact pin 21/22 are constant over the length of the pin.

Figure 8:
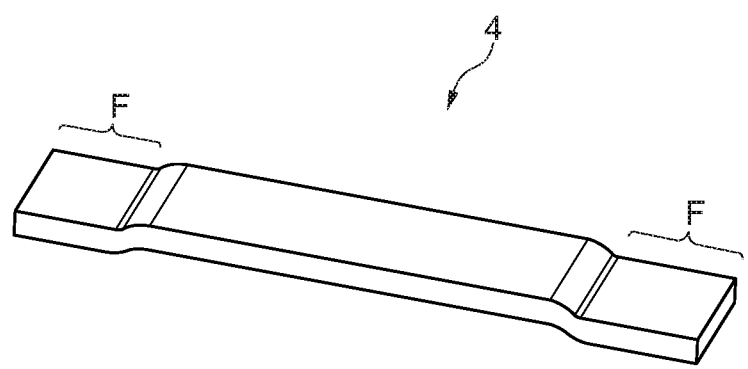
FIG. 8 shows a busbar according to the present disclosure.
Figure 9:
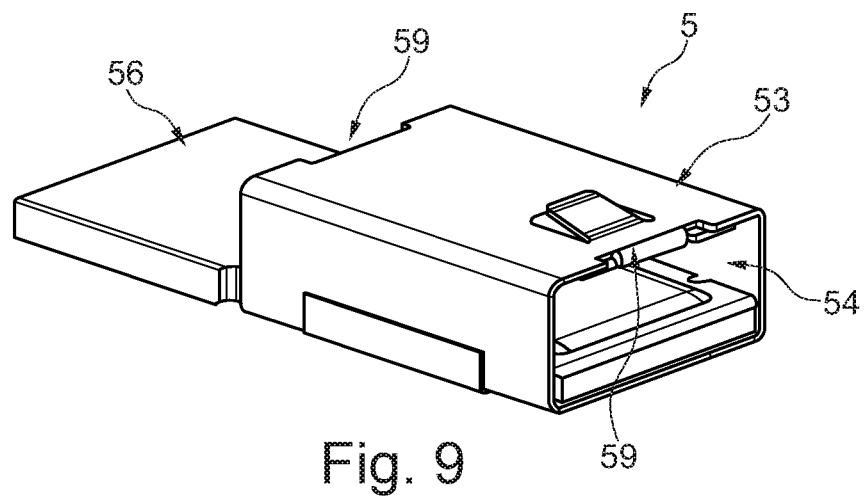
FIGS. 9 and 10 show contact housings according to the present disclosure.
Figure 10:
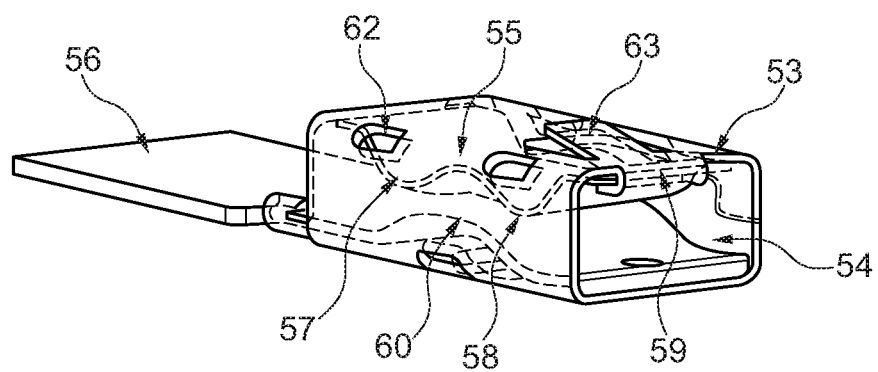

The busbar 4 connecting the contact housings 5—see FIGS. 9 and 10—is shown in FIG. 8. The length of the busbar corresponds to the spacing of the contact housings 5 (also the spacing of the associated contact pins 21/22 in the installed state) plus the length of a connecting surface F between the busbar 4 and the contact housing 5 (its contact tab 56). The width of the busbar 4 corresponds to the width of the contact tab 56 of the contact housing 5 in the area of the connecting surface F. The portion of the busbar between the connecting surfaces F is offset slightly by two bends (in the installed state facing away from the contact housing 5 of the parallel plug connector 3), but it is arranged parallel to the connecting surfaces F. This facilitates making the TOX® connection 61, since sleeves of the two contact housings 5 do not abut the busbar 4 during the clinching process, and even in the event of slight dimensional deviations they could not interfere with this connection.

FIG. 9 shows a perspective view of a contact housing 5 with a sleeve 53 that was manufactured as a bent stainless steel sheet-metal part and that encloses a receiving space 54. The contact pin 21/22 (not shown in FIG. 9) is then pushed into this receiving space 54. On both ends of the sleeve 53 tabs 59 are bent into the receiving space 54—to be shown later—for attachment of a contact spring 55. A contact tab 56 made of a highly electrically conductive material is securely connected (latched) to the sleeve 53, if applicable supported by a TOX® or welded connection, namely on the side of the sleeve 53 lying opposite the tabs 59. Thus the sleeve 53 and the contact tab 56 are parallel.

Further details on the contact housing 5 are found in FIG. 10.

The sleeve 53 is a bent stainless steel sheet in which one or two openings 62 are provided at the bending edges to facilitate the bending process. Detent tabs 63 are provided on the upper and the lower sides of the sleeve 53. With the aid of the detent tabs the sleeve 53 may be primarily latched to a housing—not shown—that encloses the contact housing 5. For this the detent tabs 63 are made resilient and bent slightly outward from the sleeve 53 during the stamping and bending phase of the manufacturing process. The surrounding housing is made of plastic, which contributes to the insulation. This housing of plastic also serves to latch the contact pin on one side of the parallel plug connector. Shrink-on tubing or overmolding may also be used to insulate the busbar.

For attachment of the sleeve 53 to the contact tab 56, the sleeve 53 includes a flexural tab that can be bent around a groove in the contact tab 56. The contact tab 56 may be attached to the sleeve 53 by a TOX® or welded joint. The contact tab 56 has a profile 60 that comes to rest inside the sleeve 53 in the installed state and projects into the receiving space 54.

The contact spring 55 is shown in FIG. 10. It is a flat stainless steel strip with a recess between two support areas on the two narrow sides of the contact spring 55 and that rest on the tabs 59 of the sleeve 53. The contact spring 55 is arched and has two symmetrical bulges 57, 58 that protrude into the receiving space 54 of the sleeve 53 when installed. Both bulges 57, 58 have a slightly stepped sinusoidal shape and they are separated by an intermediate section. As a result, the contact spring 55 is symmetrical in two axes (except the axis perpendicular to the insertion direction, towards the upper side and/or lower sides of the sleeve 53), which rules out assembly errors.

The sleeve 53 and the contact spring 55 are made of stainless steel, which is robust and rigid compared for example to elements of the copper group, tin, zinc or aluminum. In this way, an especially large contact force can be achieved without plastic deformation of one of these components.

The contact tab 56 has a plate-like, flat part with a profile 60 that in the installed state projects into the receiving space 54 of the sleeve 53. The contact tab 56 is advantageously copper or a copper alloy. The contact tab 56 may be surface-treated, such as mechanically or chemically surface-treated. The surface treatment includes a silver coating in the area of the profile 60.

In the installed state, after the sleeve 53, contact spring 55 and contact tab 56 have been assembled to form a contact housing 5—see FIG. 10—it can be seen that the profile 60 is arranged between the bulges 57, 58 of the contact spring 55, whereby uniform compression forces between the contact housing 5 and the contact pin 2 occur over a long area.

The height of the profile 60 corresponds approximately to the height of the bulges 57, 58, with the result that the receiving space 54 is positioned midway between the upper and the lower sides of the sleeve 53. Other details on the contact housing 5 may be found in DE102016201103, which is incorporated herein by reference in its entirety.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A plug connector to connect two electrical assemblies, the plug connector comprising:
    two contact pins, each contact pin being connected to an adjacent electrical assembly; and
    a parallel plug connector having a busbar securely connected to two contact housings,
    wherein the contact housings have a common insertion direction and are disposed one behind the other in the common insertion direction and the parallel plug connector is adapted to be pushed from the insertion direction onto the two contact pins simultaneously.

2. The plug connector according to claim 1, wherein the contact pins comprise a contact area oriented in the insertion direction and an attachment area connected via a bend to the contact area.

3. The plug connector according to claim 1, wherein the contact pins comprise a contact area that comes into contact with the parallel plug connector, and the contact area is tapered.

4. The plug connector according to claim 1, wherein the contact housings each comprise:
    a sleeve forming a receiving space on its inside for the contact pin to be inserted in an insertion direction;
    a contact spring attached to the inside of the sleeve; and
    a plate-like contact tab attached to the sleeve such that the receiving space for the contact pin is formed between the contact tab and the contact spring,
    wherein the contact spring includes at least one bulge, each bulge oriented toward the contact tab and the contact housings are each attached to the busbar by the plate-like contact tab.

5. The plug connector according to claim 4, wherein the at least one bulge of the contact spring is symmetrical to an imaginary axis perpendicular to the insertion direction.

6. The plug connector according to claim 4, wherein the height of the at least one bulge is a multiple of a factor of 3 to 10 of a thickness of the contact spring and defines a shape of a sine wave or a portion of a sine wave.

7. The plug connector according to claim 4, wherein the contact spring is suspended at both ends from tabs in the sleeve and the sleeve is a formed sheet metal part holding the contact spring in a positive fit or a friction fit.

8. The plug connector according to claim 4, wherein the contact tab has a profile facing the receiving space.

9. The plug connector according to claim 1, wherein the busbar and the contact housings are each connected to one another via a clinching connection between the busbar and the contact tab.

10. The plug connector according to claim 1, wherein the busbar has a second bend having a flexural component perpendicular to the insertion direction.

11. The plug connector according to claim 1, wherein the two contact housings have an identical construction.

* * * * *